US007040453B2

(12) United States Patent
Borcherding

(10) Patent No.: US 7,040,453 B2
(45) Date of Patent: May 9, 2006

(54) LUBRICANT RETENTION ASSEMBLY

(75) Inventor: Gary W. Borcherding, Florissant, MO (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 11/130,444

(22) Filed: May 16, 2005

(65) Prior Publication Data

US 2005/0205360 A1 Sep. 22, 2005

Related U.S. Application Data

(63) Continuation of application No. 10/097,510, filed on Mar. 14, 2002, now abandoned.

(51) Int. Cl.
*F01M 1/06* (2006.01)

(52) U.S. Cl. ........................................ 184/7.1; 384/139

(58) Field of Classification Search ................. 184/7.1, 184/70; 384/135, 136, 139, 152

See application file for complete search history.

(56) References Cited

U.S. PATENT DOCUMENTS 1,945,219 A 1/1934 Fruhstofer
3,183,153 A 5/1965 Turk
4,217,007 A 8/1980 Filippa
4,599,006 A 7/1986 Abel
4,711,590 A 12/1987 Lakin
5,575,355 A 11/1996 Williams et al.
5,683,184 A 11/1997 Striedacher et al.
5,798,589 A 8/1998 Ohi et al.
6,008,557 A 12/1999 Dornhoefer et al.

FOREIGN PATENT DOCUMENTS

DE 299 21 718 U1 5/2001
FR 2 650 130 A1 1/1991

*Primary Examiner*—David Fenstermacher
(74) *Attorney, Agent, or Firm*—Thompson Coburn, LLP

(57) ABSTRACT

A lubricant retention assembly is employed with an electric motor to prevent the loss of lubricant from a self contained lubricant reservoir of the motor. The lubricant retention assembly includes a thrust collar mounted on the motor shaft and a bearing cap surrounding the thrust collar, where the thrust collar has an annular flange that throws lubricant leaking along the shaft radially outwardly toward the bearing cap. The bearing cap has an angled interior surface that deflects the lubricant thrown from the annular flange of the thrust collar back into the motor interior and toward the lubricant reservoir. A thrust washer is also provided on the shaft adjacent the thrust collar and prevents lubricant leakage along the shaft between the interface of the shaft and the thrust collar. The thrust washer and thrust collar have complementary configurations that maintain the thrust washer in position on the shaft adjacent the thrust collar.

29 Claims, 2 Drawing Sheets

22 24 28 26 30 C 100 102 110 98 106 108 94 96 16 20 84 86 88 12 A A 92 90 70 82 10 80 112 72 14 18 116 C 104 76 114

A
A
C
C
16
84
86
88
90
70
82
80
112
72
96
94
108
106
98
110
102
100
114
76
104
30
26
28
24
22
116
20
12
92
10
14
18

LUBRICANT RETENTION ASSEMBLY

This application is a continuation of application Ser. No. 10/097,510, filed on Mar. 14, 2002 now abandoned.

BACKGROUND OF THE INVENTION (1) Field of the Invention

The present invention pertains to a lubricant retention assembly employed with an electric motor that has a self-contained lubricant reservoir. More specifically, the present invention pertains to a thrust collar mounted on the motor shaft and a bearing cap surrounding the thrust collar, where the thrust collar has an annular flange that throws lubricant leaking along the shaft radially outwardly toward the bearing cap and the bearing cap has an angled interior surface that deflects the lubricant thrown by the annular flange into the motor interior and toward the lubricant reservoir. In addition, a thrust washer is provided on the shaft adjacent the thrust collar for preventing lubricant leakage along the shaft between the interface of the shaft and thrust collar. The thrust washer and thrust collar have complementary configurations that maintain the thrust washer in position on the shaft adjacent the thrust collar.

(2) Description of the Related Art

In most motor constructions having rotating drive shafts, proper lubrication of the drive shaft and the bearing surfaces or bearing assemblies supporting the shaft is essential for insuring a prolonged operating life and quiet operation of the motor. Some larger motors are constructed with their own lubrication circuits where a pump pumps lubricant from a reservoir to the shaft bearing assemblies and the lubricant is then directed back to the reservoir. The internal combustion motors of automobiles are examples of these types of motors. Any lubricant lost from the motor over time due to leakage past the bearing assemblies supporting the motor shaft can be replenished by supplying additional lubricant to the motor reservoir from a separate source. Because the lubricant can be replenished with periodic maintenance of the motor, the occasional loss of lubricant or loss of lubricant over time does not significantly detract from the operating life of the motor.

However, this is not the case with smaller motors, for example electric motors used in electric household appliances like dishwashers, clothes washers and clothes dryers. These types of motors are contained in the enclosures of the appliance and are inaccessible for replenishing lubricant lost due to leakage. The lubrication reservoir of these types of motors is self-contained and cannot be replenished. The motor shafts for small motor constructions are usually not supported for rotation by ball bearing or roller bearing assemblies, but by sleeve bearings or porous sintered metal bearings where bearing surfaces support the shafts for rotation. Loss of lubricant from these types of motors can cause the bearings to fail and can have serious consequences on the motor's operational life.

One of the major causes for sleeve bearing failures is loss of oil out of the bearing/lubrication system. An example of a conventional bearing/lubrication system used in appliance motor designs is shown in FIG. 1. The system shown in FIG. 1 is known in the prior art, and therefore only a partial view of the motor is shown.

FIG. 1 shows a porous powdered metal or babbitt metal type bearing (10) supporting the motor shaft (12) for rotation in an end shield (14) of the motor. The center axis A—A of the shaft (12) defines mutually perpendicular axial and radial directions. A cooling fan (16) is shown mounted on the shaft (12) to the right of the bearing assembly shown in FIG. 1. The interior of the motor is to the right of the end shield in FIG. 1. The shaft (12) extends through a cylindrical collar (18) of the motor end shield that surrounds the end shield shaft opening (20). The bearing (10) is held in the shaft opening (20) by its engagement with bearing seat surfaces (22) of the end shield on one side of the bearing and a bearing retainer (24) on the opposite side of the bearing. The typical bearing retainer (24) is constructed as a stamped metal disc (26) with a peripheral rim (28) that is press-fit into the end shield collar (18). A plurality of resilient fingers (30) project radially inwardly from the disk (26) and engage against the bearing (10) and hold the bearing to the bearing seat surfaces (22).

The typical bearing lubricant feeding and return system comprises a lubricating oil, felt or other fibrous material (32) injected with the oil, a thrust collar/oil slinger (34) and a bearing cap (36).

As seen in FIG. 1, the thrust collar/oil slinger (34) is mounted in a press-fit engagement on the shaft (12). A rubber washer (38) and a metal washer (40) are positioned between the collar (34) and the bearing (10). The engagement of the rubber washer (38) around the shaft provides a seal around the shaft surface that minimizes oil from leaking out of the motor interior along the interface between the shaft and the interior bore of the thrust collar (34). The metal washer (40) provides a sliding surface between the rubber washer (38) and the bearing (10) that prevents wear of the rubber washer on rotation of the shaft.

The bearing cap (36) is typically stamped from sheet metal and is formed with a resilient annular outer wall (42) that is press-fit into the end shield collar (18) surrounding the shaft opening (20). A cylindrical side wall (44) extends axially from the bearing cap outer wall (42) to a circular end wall (46) of the bearing cap. The bearing cap end wall (46) extends radially inwardly from the bearing cap side wall (44) toward the motor shaft (12) and terminates at an axially inwardly projecting lip (48) of the cap. The cap lip (48) is spaced radially outwardly from the fan (16) and shaft (12) leaving a clearance area (50) between the cap lip (48) and the fan (16) and shaft (12).

The area axially between the bearing retainer disk (26) and the bearing cap end wall (46) and radially outside the dashed line B—B shown in FIG. 1 is typically occupied by the lubricant-permeated fibrous material. This material is not shown in FIG. 1 to avoid obscuring other component parts of the bearing lubrication system.

In the intended operation of the prior art bearing lubrication system shown in FIG. 1, any lubricant advancing along the shaft (12) would be restricted from passing through the interface of the thrust collar/oil slinger (34) and the shaft by the rubber washer (38). The washer (38) is typically stretched as it is mounted on the shaft (12) and is in a tight engagement around the shaft, preventing any lubricant from advancing beyond the washer out of the motor. However, rotation of the shaft (12) also causes lubricant that is advanced along the shaft to move radially outwardly over the metal washer (40) and the thrust collar/oil slinger (34). Any lubricant that travels radially outwardly over the surfaces of the metal washer (40) is thrown from the peripheral edge of the metal washer into the fibrous material (32) that absorbs the lubricant. The material (32) wicks the lubricant back to the bearing (10). The lubricant soaks through the porous bearing to its center bore, re-lubricating the rotating engagement of the shaft (12) with the bearing (10). Any lubricant that travels radially outwardly along the rubber washer (38) is transferred to either the metal washer (40) or the thrust collar/oil slinger (34) which have greater radial dimensions than the rubber washer. Any lubricant that travels radially outwardly along the thrust collar/oil slinger (34) is thrown radially off of an annular rim (54) on the side of the thrust collar or off of the outer peripheral edge (56) of the thrust collar to the fibrous material (32). This lubricant is then wicked through the material (32) back to the porous bearing (10) that absorbs the lubricant and again transfers the lubricant to the rotating engagement of the shaft (12) with the bearing (10).

The bearing lubrication system described above and shown in FIG. 1 has been found to be disadvantaged in that lubricant thrown radially off the spinning thrust collar will at times impact against the interior surface of the fibrous material (32) represented by the dashed lines B—B and splash back onto the surface of the thrust collar (58) outside of or to the right of the thrust collar peripheral edge (56). When the motor is stopped or running, oil that has splashed onto the thrust collar outer surface (58) can advance along the surface of the fan hub (60) reaching the fan blades (62). The next time the motor is activated, the lubricant that reaches the fan hub (60) and fan blades (62) will fly off the blades, resulting in a loss of lubricant from the lubricant reservoir of the motor. In addition, when motors having a bearing lubrication system such as that shown in FIG. 1 are employed in a clothes dryer, lint can collect in the opening or clearance (50) between the bearing cap lip (48) and the fan (16) and soak up oil, causing additional loss of lubricant from the motor lubricant reservoir. Over time, the loss of oil can result in failing of the motor bearings requiring repair of the motor and the appliance.

What is needed to overcome the above shortcomings of the prior art bearing lubrication system is a system that reliably retains lubricant in the self-contained lubricant reservoir of an electric motor.

SUMMARY OF THE INVENTION

The lubricant retention assembly of the invention overcomes the shortcomings of the prior art bearing lubrication system by providing a thrust collar and a bearing cap that are designed to function together to reliably return any lubricant that reaches the thrust collar to the oil-permeated fibrous material of the self-contained lubricant reservoir of the motor. In addition to the novel constructions of the thrust collar and bearing cap, the bearing lubrication system of the invention also comprises a rubber washer of novel construction that is complementary to the construction of the thrust collar and a novel application of the fibrous material impregnated with the lubricant that forms the lubricant reservoir of the invention.

The thrust collar and thrust washer of the invention are mounted on the motor shaft in basically the same positions as the thrust collar and thrust washer of the prior art, and the bearing cap of the invention is mounted in the end shield collar surrounding the shaft opening of the end shield in basically the same position as the bearing cap of the prior art.

The thrust collar has a cylindrical hub that is mounted on the shaft. The collar hub has a center bore surrounded by a cylindrical interior surface of the hub. The hub interior surface is dimensioned so that the thrust collar will fit in a friction engagement on the exterior surface of the shaft for rotation of the collar with the shaft. The thrust collar hub also has a cylindrical exterior surface that extends between axially opposite first and second annular end surfaces of the thrust collar. The first annular end surface of the collar hub faces toward the bearing of the motor shaft. This first end surface of the collar hub is beveled so that it extends axially over the shaft as it extends from the interior surface of the collar hub to the exterior surface of the collar hub. The opposite, second annular end surface of the hub has an annular flange that extends radially outwardly from the hub. As the annular flange extends radially away from the collar hub, it also extends axially over the hub exterior surface, giving the flange a conical shape. The flange extends radially outwardly to a peripheral end surface of the flange that is parallel to the center axis of the motor shaft and extends around the hub exterior surface.

The bearing cap is mounted to the end shield collar surrounding the shaft opening of the end shield. The bearing cap has an annular side wall that extends axially away from the end shield collar and the bearing and radially toward the thrust collar mounted on the shaft. The cap side wall extends radially inwardly to an inner edge of the cap that extends around the annular flange of the thrust collar on an axially opposite side of the flange peripheral end surface from the bearing.

In the bearing lubrication system of the invention, the fibrous material permeated with the lubricant is packed in the end shield collar against the bearing retainer and surrounding the bearing. However, the fibrous material does not extend axially beyond the end of the bearing and does not enter into the area surrounded by the bearing cap as was done in the prior art.

The conventional rubber washer of the prior art is replaced in the bearing lubrication system of the invention with a resilient o-ring. The o-ring is slightly stretched as it is positioned on the shaft in the same position as the prior art rubber washer, between the metal washer and the first annular end surface of the thrust collar. The circular cross section of the o-ring thrust washer provides an improved lubricant seal that prevents lubricant from passing along the shaft exterior surface and between the interface of the shaft and the interior surface of the o-ring thrust washer. In addition, with the reduced exterior diameter dimension of the thrust collar hub, a conventional rubber washer would be prone to stretching away from the shaft and moving onto the thrust collar hub due to any relative rotation between the thrust collar and metal washer and/or due to a high thrust impact or a high thrust load on the shaft. With the rubber washer moved onto the thrust collar hub, it is ineffective in stopping lubricant leakage along the shaft and also creates axial end play of the shaft. The circular cross section of the o-ring thrust washer seats inside a conical or frustum shaped recess formed by the beveled first annular end surface of the thrust collar hub. Because the first annular end surface of the thrust collar hub extends over a portion of the o-ring as the end surface extends from the interior bore surface of the hub to the exterior surface of the hub, the annular end surface prevents the o-ring from expanding or stretching outwardly from the shaft surface due to any relative rotation between the thrust collar and the bearing and/or due to a high thrust impact or a high thrust load on the shaft, and thereby prevents the o-ring thrust washer from leaving the shaft surface and moving onto the hub of the thrust collar.

Thus, with the thrust collar of the invention mounted on the motor shaft and the bearing cap of the invention surrounding the thrust collar, any lubricant that leaks along the shaft to the thrust collar will be thrown from the thrust collar flange toward the angled interior surface of the cap side wall and will be deflected by the cap side wall back into the motor interior toward the fibrous material of the lubricant reservoir. In addition, with the o-ring thrust washer of the invention mounted on the shaft preventing lubricant leakage between the interface of the shaft and the thrust collar, the beveled annular end surface of the thrust collar hub will prevent the o-ring thrust washer from moving from its position on the shaft onto the hub of the thrust collar.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENT

Figure 1:
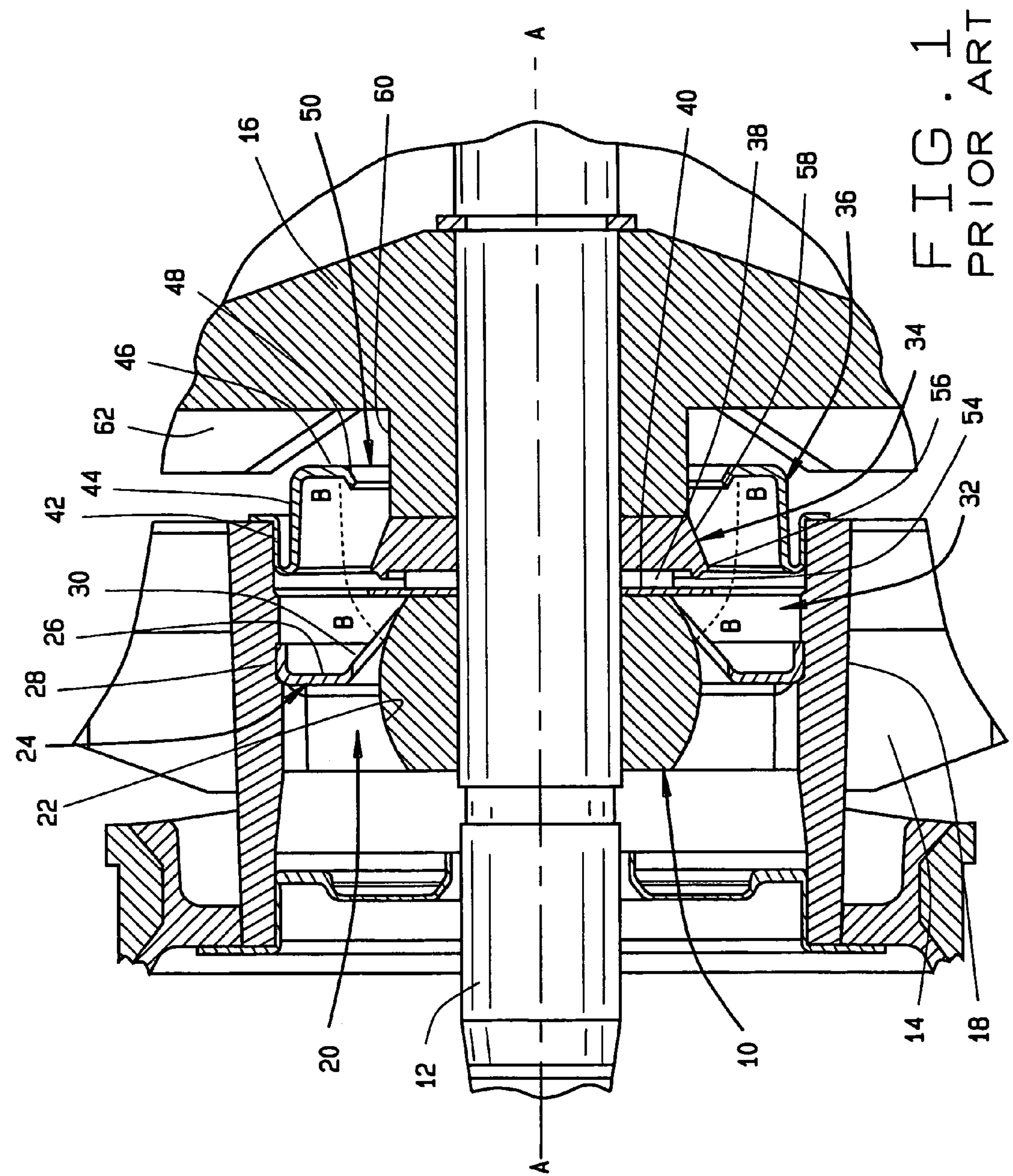
FIG. 1 is a partial sectioned view of a motor end shield and shaft of the prior art bearing lubrication system.

As stated earlier, the lubricant retention assembly of the invention overcomes the shortcomings of the prior art bearing lubrication system by providing a thrust collar (70) and a bearing cap (72) that are designed to function together to reliably return any lubricant that reaches the thrust collar to the oil permeated fibrous material of the self contained lubricant reservoir of the motor. In addition to the novel constructions of the thrust collar (70) and bearing cap (72), the bearing lubrication system of the invention also comprises a rubber washer (76) of novel construction that is complementary to the construction of the thrust collar as well as a novel application of the lubricant permeated fibrous material that forms the lubricant reservoir of the invention. Because the lubricant retention assembly of the invention is an improvement over the prior art bearing lubrication system described earlier, the assembly of the invention will be described and explained using the same operative environment of FIG. 1 that was employed in describing the prior art bearing lubrication system. The component parts of the motor referred to in describing the prior art bearing lubrication system shown in FIG. 1 make up the illustrated environment of the lubrication retention assembly of the invention shown in FIG. 2 and are identified by the same reference numbers shown in FIG. 1.

The thrust collar (70) of the invention is preferably constructed of a plastic material, but may be constructed of other types of materials. The thrust collar (70) is basically comprised of a cylindrical hub (80) and an annular flange (82) projecting radially outwardly from one end of the hub. The collar hub (80) has a cylindrical exterior surface (84) and a cylindrical interior surface (86). The hub interior surface (86) surrounds a center bore (88) of the hub and has an interior diameter dimension that allows the hub to be slipped on the shaft (12) in an interference fit or friction fit between the hub (80) and shaft (12) that causes the thrust collar (70) to rotate with the shaft (12). The thrust collar hub (80) has an axial length between opposite first (88) and second (90) annular end surfaces of the thrust collar. The first annular end surface (88) faces toward the bearing (10) and the motor end shield (14) and the opposite second annular end surface (90) faces away from the bearing and end shield. The first annular end surface (88) of the hub is beveled so that it extends radially away from the shaft (12) and axially over the shaft (12) as it extends from the thrust collar hub interior surface (86) to the thrust collar hub exterior surface (84). The beveled configuration of the first annular end surface (88) defines a conical or frustum shaped recessed area (92) within the first annular end surface (88).

The opposite, second annular end surface (90) of the hub is a flat surface that is perpendicular to the shaft center axis and extends radially outwardly and merges with the thrust collar annular flange (82). As the annular flange (82) extends radially outwardly from the thrust collar hub exterior surface (84) it gradually angles over the hub exterior surface (84), giving the flange (82) a conical shape. The flange has opposite interior (94) and exterior (96) surfaces that both extend axially over the thrust collar hub exterior surface (84) as they extend radially away from the thrust collar hub (80). The flange interior (94) and exterior (96) surfaces extend radially away from the thrust collar hub (80) to a peripheral end surface (98) of the flange. The flange peripheral end surface (98) is parallel to the center axis of the motor shaft and extends around the hub exterior surface (84). The flat peripheral end surface (98) of the flange merges with the angled interior surface (94) of the flange and forms a sharp annular corner or edge (100) on the flange that promotes oil droplet formation.

Figure 2:
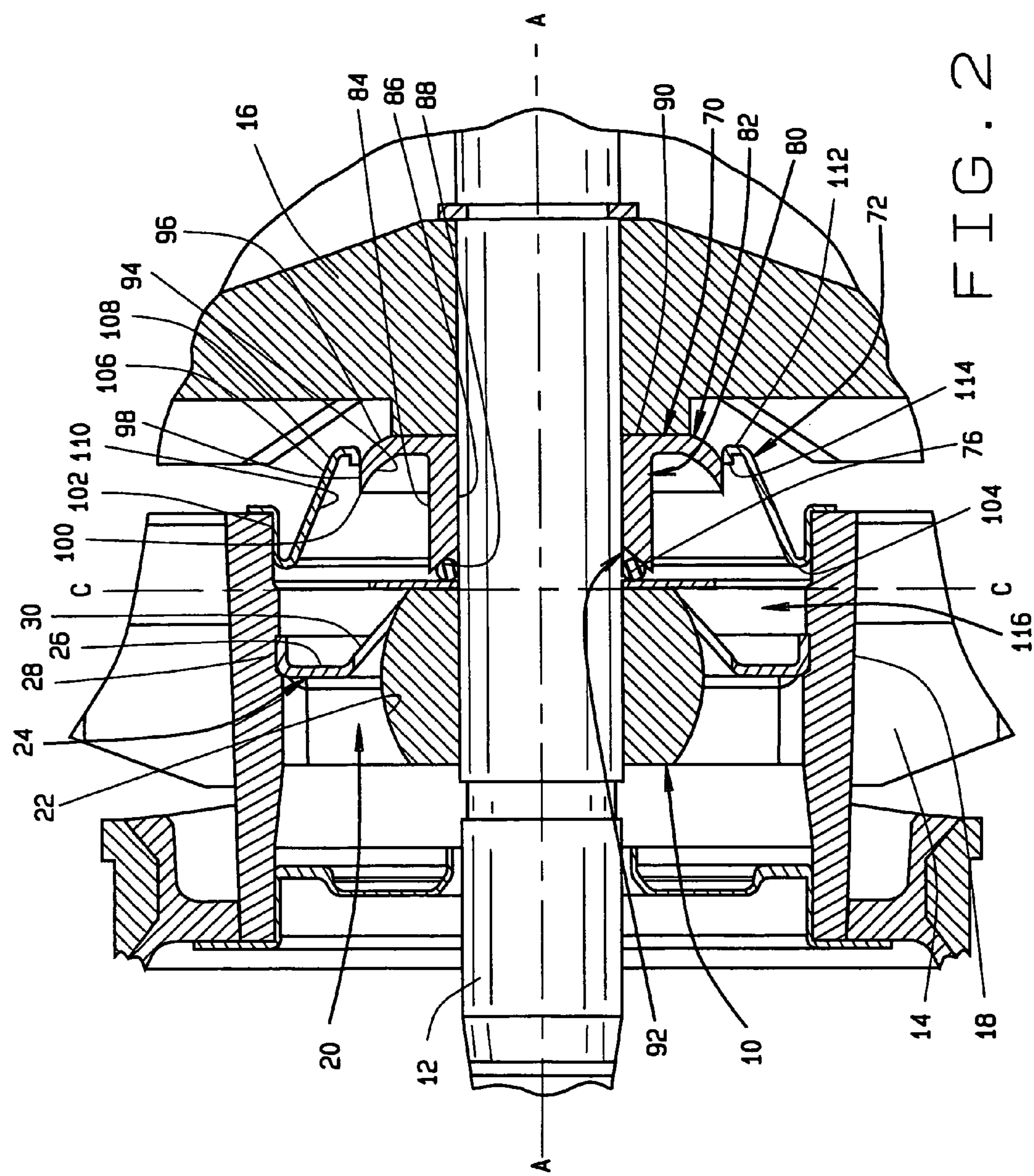
FIG. 2 is a partial sectioned view of the same motor end shield and shaft of FIG. 1 and also showing the bearing lubrication system of the invention.

The bearing cap (72) is stamped from metal as is the bearing cap (36) of the prior art. Other types of materials could also be used in constructing the bearing cap. The bearing cap (72) of the invention is formed with a rim (102) at its outer perimeter that is dimensioned to be press fit into the end shield collar (18) in attaching the bearing cap (72) over the shaft opening (20) of the end shield collar (18). An annular bend (104) formed in the bearing cap connects the outer rim (102) of the cap with an annular side wall (106) of the bearing cap. The bearing cap side wall (106) has opposite exterior (108) and interior (110) surfaces that both extend radially inwardly as the side wall extends from the cap outer rim (102) toward the shaft (12). As seen in FIG. 2, the bearing cap side wall (106) extends axially away from the end shield collar (18) and axially away from the bearing (10) as it extends radially inwardly toward the thrust collar (34) mounted on the motor shaft (12). This gives the side wall (106) a conical shape. The bearing cap side wall (106) extends radially inwardly to an inner annular bend (112) formed in the cap that curves inside the side wall interior surface (110) to an inner annular edge (114) of the cap. The inner edge (114) of the cap side wall extends completely around the thrust collar flange (82) on an axially opposite side of the flange peripheral end surface (98) from the shaft bearing (10). As seen in FIG. 2, the side wall inner edge (114) is dimensioned to provide only a minimum amount of clearance for passage of the thrust collar annular flange (82) through the opening defined by the bearing cap sidewall inner edge (114).

In the bearing lubrication system of the invention, the fibrous material permeated with the lubricant (116) is packed in the end shield collar (18) against the bearing retainer (24) and surrounding the bearing (10), but does not extend into the area surrounded by the bearing cap side wall (106) as was done in the prior art bearing lubrication system. Instead, the lubricant permeated fibrous material (116) is packed into the end shield collar (18) surrounding the bearing (10) and does not extend axially beyond the bearing or beyond the dashed line C—C shown in FIG. 2 in the preferred embodiment of the invention.

In the bearing lubrication system of the invention, the conventional rubber washer of the prior art is replaced with a resilient washer having at least a portion dimensioned to fit into the recess at the thrust collar first end surface, preferably an o-ring (76). The o-ring thrust washer (76) has an interior diameter dimension that is slightly smaller than the exterior diameter dimension of the shaft (12), resulting in the o-ring being stretched slightly as it is positioned on the shaft in the same position as the prior art rubber washer, i.e. between the metal washer (40) and the first annular end surface (88) of the thrust collar. The o-ring (76) also has an exterior diameter dimension that is slightly smaller than the exterior diameter dimension of the thrust collar hub exterior surface (84). The circular cross section of the o-ring thrust washer (76) provides an improved lubricant seal that prevents lubricant from passing along the exterior surface of the shaft (12) and between the interface of the shaft (12) and the interior of the o-ring thrust washer (76). The dimensioning of the o-ring thrust washer (76) also allows it to be received at least partially in the frustum shaped recessed area (92) surrounded by the first annular surface (88) of the thrust collar. As explained earlier, the reduced exterior diameter dimension of the thrust collar hub (80) could lead to the conventional rubber washer stretching away from the shaft (12) and moving onto the thrust collar hub due to any relative rotation between the thrust collar and the metal washer and/or due to a high thrust impact or a high thrust load on the shaft. With the rubber washer moved onto the thrust collar hub, it would be ineffective in stopping lubricant leakage along the shaft. The circular cross section of the o-ring thrust washer (76) and its dimensioning seat the o-ring inside the conical or frustum shaped recess (92) formed by the beveled first annular end surface (88) of the thrust collar hub. A portion of the hub first annular end surface (88) extends axially over the o-ring thrust washer (76) and thereby prevents the thrust washer from stretching away from the shaft (12) and moving onto the thrust collar hub (80).

In operation of the lubricant retention assembly of the invention, as the shaft (12) rotates, the tight, stretched engagement of the o-ring thrust washer (76) around the shaft prevents any leakage of lubricant along the shaft beyond the o-ring (76) where it could potentially pass through the interface between the thrust collar (70) and the shaft and reach the fan (16) where the lubricant would be thrown from the motor. Any lubricant that reaches the exterior surface (84) of the thrust collar hub and moves away from the motor interior to the thrust collar annular flange (82) will be cause to move across the flange interior surface (86) by rotation of the thrust collar. The lubricant moving over the flange interior surface (86) will reach the flange peripheral edge corner (100). The sharp annular corner (100) between the flange interior surface (86) and the flange peripheral end surface (98) causes lubricant droplets to be thrown radially off of the edge corner (100) toward the interior surface (110) of the bearing cap annular side wall (106). The lubricant droplets thrown from the thrust collar (80) impact against the bearing cap side wall interior surface (110) and are deflected axially inwardly toward the fibrous material (116) packed around the bearing (10). Thus, the problem of splashing lubricant impacting with the fibrous material being deflected outside the bearing cap of the prior art is eliminated. The close tolerance between the bearing cap side wall inner edge (114) and the thrust collar flange peripheral surface (98) ensures that no lubricant is deflected from the bearing cap (72) outside the bearing cap and the thrust collar flange (82) where it would be lost from the lubricant reservoir.

While the present invention has been described by reference to a specific embodiment, it should be understood that modifications and variations of the invention may be constructed without departing from the scope of the invention defined in the following claims.

The invention claimed is:

1. A lubricant retention assembly employed in a shaft opening of a device containing a bearing and a shaft of the device, the assembly comprising:

a thrust collar having an exterior surface and an opposite, cylindrical interior surface surrounding a center bore of the thrust collar, the interior surface having an interior diameter dimension for mounting of the thrust collar on the shaft for rotation of the thrust collar with the shaft, the center bore having a center axis that defines mutually perpendicular axial and radial directions relative to the thrust collar, and the thrust collar having an annular flange that projects outwardly from the thrust collar exterior surface to a peripheral edge of the annular flange, the annular flange having opposite interior and exterior surfaces and the interior surface extending both axially and radially over the thrust collar exterior surface, and, the annular flange having a peripheral surface at the flange peripheral edge, the peripheral surface extending axially between the flange interior surface and the flange exterior surface and the flange peripheral surface being parallel to the thrust collar center axis, the flange peripheral surface being oriented at substantially an acute angle relative to the flange interior surface and the flange peripheral surface being oriented at substantially an obtuse angel relative to the flange exterior surface.

2. The assembly of claim 1, further comprising:

the annular flange extending in both the axial direction and the radial direction simultaneously from the thrust collar exterior surface to the annular flange peripheral edge.

3. The assembly of claim 1, further comprising:

the flange exterior surface having a conical shape and the flange interior surface surrounding a conically shaped recess within the flange interior surface.

4. The assembly of claim 1, further comprising:

the annular flange exterior surface extending around the thrust collar exterior surface.

5. A lubricant retention assembly employed in a shaft opening of a device containing a bearing and a shaft of the device, the assembly comprising:

a thrust collar having an exterior surface and an opposite, cylindrical interior surface surrounding a center bore of the thrust collar, the interior surface having an interior diameter dimensioned for mounting of the thrust collar on the shaft for rotation of the thrust collar with the shaft, the center bore having a center axis that defines mutually perpendicular axial and radial directions relative to the thrust collar, and the thrust collar having an annular flange that projects outwardly from the thrust collar exterior surface to a peripheral edge of the annular flange; and, a bearing cap positioned around the thrust collar, the bearing cap having a radially outer perimeter with means for attaching the bearing cap to the shaft opening of the device and the bearing cap having a radially inner edge that circumscribes the annular flange of the thrust collar.

6. The assembly of claim 5, further comprising:

the bearing cap having an annular side wall that extends between the inner edge and the outer perimeter of the bearing cap and the side wall having an interior surface that opposes the thrust collar exterior surface and extends radially toward the thrust collar as the side wall interior surface extends axially from the bearing cap outer perimeter to the bearing cap inner edge.

7. The assembly of claim 6, further comprising:

the bearing cap side wall having an exterior surface opposite the side wall interior surface and the side wall exterior surface extends radially toward the thrust collar as the side wall exterior surface extends axially from the bearing cap outer perimeter to the bearing cap inner edge.

8. The assembly of claim 5, further comprising:

the bearing cap having a side wall that extends between the outer perimeter and the inner edge of the bearing cap, the side wall having opposite interior and exterior surfaces and the side wall interior surface surrounding a conically shaped recess within the side wall interior surface.

9. The assembly of claim 8, further comprising:

the side wall exterior surface being conical.

10. A lubricant retention assembly employed in a shaft opening of a device containing a bearing and a shaft of the device, the assembly comprising:

a thrust collar having a center bore and an exterior surface and an interior surface surrounding the center bore of the thrust collar, the interior surface having an interior diameter dimensioned for mounting of the thrust collar on the shaft for rotation of the thrust collar with the shaft, the center bore having a center axis that defines mutually perpendicular axial and radial directions relative to the thrust collar, and the thrust collar having an annular flange that projects radially outwardly from the thrust collar to a peripheral edge of the flange; and a bearing cap positioned around the thrust collar, the bearing cap having a radially outer perimeter with means for attaching the bearing cap to the shaft opening of the device and the bearing cap having an annular side wall with an interior surface that extends both axially from the outer perimeter and radially inwardly from the outer perimeter at the same time to a radially inner edge of the bearing cap that extends around the thrust collar.

11. The assembly of claim 10, further comprising:

the bearing cap side wall having an exterior surface that is opposite the interior surface, the side wall exterior surface being conical.

12. The assembly of claim 10, further comprising:

the bearing cap side wall interior surface being positioned radially outwardly from the thrust collar flange peripheral edge.

13. The assembly of claim 12, further comprising:

the bearing cap side wall inner edge being positioned radially outwardly from the thrust collar and axially to one side of the thrust collar flange peripheral edge.

14. The assembly of claim 13, further comprising:

the bearing cap side wall inner edge being positioned on an axially opposite side of the thrust collar flange peripheral edge from the bearing.

15. The assembly of claim 10, further comprising:

a fibrous, lubricant permeated material positioned in the shaft opening and spaced axially from the bearing cap side wall interior surface.

16. The assembly of claim 10, further comprising:

a fibrous, lubricant permeated material positioned in the shaft opening and spaced axially from the bearing cap and the thrust collar so that there is no fibrous, lubricant permeated material positioned radially between the thrust collar and the bearing cap.

17. A lubricant retention assembly employed in a shaft opening of a device containing a bearing and a shaft of the device, the assembly comprising:

a thrust collar having an exterior surface and an opposite, cylindrical interior surface surrounding a center bore of the thrust collar, the interior surface having an interior diameter dimensioned for mounting of the thrust collar on the shaft for rotation of the thrust collar with the shaft, the center bore having a center axis that defines mutually perpendicular axial and radial directions relative to the thrust collar, and the thrust collar having an annular flange that projects outwardly from the thrust collar exterior surface to a peripheral edge of the annular flange; and, the thrust collar having two extreme axial end surfaces, one of the two extreme axial end surfaces being an annular end surface at one axial end of the thrust collar and is not on the flange, the one of the two extreme axial end surfaces being oriented obliquely relative to the center axis.

18. The assembly of claim 17, further comprising:

the annular end surface of the thrust collar extending axially away from the interior surface as the annular end surface extends radially to the exterior surface.

19. The assembly of claim 17, further comprising:

the annular end surface being a beveled surface.

20. The assembly of claim 17, further comprising:

a thrust washer having an interior surface surrounding a center bore of the thrust washer, the thrust washer interior surface having an interior diameter dimensioned for mounting the thrust washer on the shaft adjacent the annular end surface of the thrust collar for rotation of the thrust washer with the shaft and the thrust collar, and the thrust washer being constructed of a resilient material.

21. The assembly of claim 20, further comprising:

the thrust washer interior diameter being dimensioned for mounting the thrust washer on the shaft by stretching the thrust washer around the shaft.

22. The assembly of claim 20, further comprising:

the thrust washer being an o-ring.

23. The assembly of claim 17, further comprising:

the thrust collar exterior surface having a diameter dimension;

a thrust washer having an interior surface surrounding a center bore of the thrust washer, the thrust washer interior surface having an interior diameter dimensioned for mounting the thrust washer on the shaft adjacent the annular end surface of the thrust collar for rotation of the thrust washer with the shaft and the thrust collar, the thrust washer having an exterior surface radially opposite the interior surface with the thrust washer exterior surface having a diameter dimension that is smaller than the thrust collar exterior surface diameter dimension.

24. The assembly of claim 23, further comprising:

the thrust washer being an o-ring.

25. A lubricant retention assembly employed in a shaft opening of a device containing a bearing and a shaft of the device, the assembly comprising:

a thrust collar having an exterior surface and an opposite, cylindrical interior surface surrounding a center bore of the thrust collar, the interior surface having an interior diameter dimensioned for mounting of the thrust collar on the shaft for rotation of the thrust collar with the shaft, the center bore having a center axis that defines mutually perpendicular axial and radial directions relative to the thrust collar, and the thrust collar having an annular flange that projects outwardly from the thrust collar exterior surface to a peripheral edge of the annular flange; and, the thrust collar having an annular end surface at one axial end of the thrust collar, the annular end surface being oriented obliquely relative to the center axis, the annular end surface extending in the radial direction between the interior surface and the exterior surface of the thrust collar and the annular end surface extending in the axial direction between the interior surface and the exterior surface of the thrust collar.

26. A lubricant retention assembly employed in a shaft opening of a device containing a bearing and a shaft of the device, the assembly comprising:

a thrust collar having an exterior surface and an opposite, cylindrical interior surface surrounding a center bore of the thrust collar, the interior surface having an interior diameter dimensioned for mounting of the thrust collar on the shaft for rotation of the thrust collar with the shaft, the center bore having a center axis that defines mutually perpendicular axial and radial directions relative to the thrust collar, and the thrust collar having an annular flange that projects outwardly from the thrust collar exterior surface to a peripheral edge of the annular flange; and, the thrust collar having an annular end surface at one axial end of the thrust collar, the annular end surface being oriented obliquely relative to the center axis, and the annular end surface defining a frustum shaped recess in the one axial end of the thrust collar.

27. The assembly of claim 26, further comprising:

a thrust washer having an interior surface surrounding a center bore of the thrust washer, the thrust washer interior surface having an interior diameter dimensioned for mounting the thrust washer on the shaft adjacent the annular end surface of the thrust collar for rotation of the thrust washer with the shaft and the thrust collar.

28. The assembly of claim 27, further comprising:

at least a portion of the thrust washer being received in the frustum shaped recess in the one axial end of the thrust collar.

29. The assembly of claim 28, further comprising:

the thrust washer being an o-ring.

* * * * *